United States Patent
Lee et al.

(10) Patent No.: US 6,734,939 B2
(45) Date of Patent: May 11, 2004

(54) ARRAY SUBSTRATE FOR LIQUID CRYSTAL DISPLAY DEVICE

(75) Inventors: Joun-Ho Lee, Taegu (KR); Chung-Sun Lim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 114 days.

(21) Appl. No.: 09/910,722

(22) Filed: Jul. 24, 2001

(65) Prior Publication Data

US 2002/0008821 A1 Jan. 24, 2002

(30) Foreign Application Priority Data

Jul. 24, 2000 (KR) .................................... 2000-0042534

(51) Int. Cl.⁷ ..................... G02F 1/1333; G02F 1/1343

(52) U.S. Cl. ......................... 349/141; 349/40; 349/139

(58) Field of Search ............................ 349/37, 54, 139, 349/141, 143, 149, 153, 192; 257/59; 345/96

(56) References Cited

U.S. PATENT DOCUMENTS

| | | | | |
|---|---|---|---|---|
| 5,574,583 A | * | 11/1996 | Kim ........................... | 349/122 |
| 5,598,285 A | | 1/1997 | Kondo et al. ................. | 349/39 |
| 5,744,820 A | * | 4/1998 | Matsushima et al. ......... | 257/59 |
| 5,909,035 A | * | 6/1999 | Kim ............................ | 257/59 |
| 6,025,835 A | * | 2/2000 | Aoki et al. .................. | 345/204 |
| 6,396,468 B2 | * | 5/2002 | Matsushima et al. ......... | 345/87 |

OTHER PUBLICATIONS

R. Kieler et al.; "In–Plane Switching of Nematic Liquid Crystals"; Japan Display '92; pp. 547–550.
M. Oh–e, et al.; "Principles and Characteristics of Electro–Optical Behaviour with In–Plane Switching Mode"; Asia Display '95; pp. 577–580.
M. Ohta et al.; "Development of Super–TFT–LCDs with In–Plane Switching Display Mode"; Asia Display '95; pp. 707–710.
S. Matsumoto et al.; Display Characteristics of In–Plane Switching (IPS) LCDs and a Wide–Viewing–Angle 14.5–in. OPS TFT–LCD; Euro Display '96; pp. 445–448.
H. Wakemoto et al.; "An Advanced In–Plane Switching Mode TFT–LCD"; SID 97 Digest; pp. 929–932.
S.H. Lee et al.; High–Transmittance, Wide–Viewing–Angle Nematic Liquid Crystal Display Controlled by Fringe–Field Switching; Asia Display '98; pp. 371–374.

* cited by examiner

Primary Examiner—Kenneth Parker
(74) Attorney, Agent, or Firm—McKenna Long & Aldridge LLP

(57) ABSTRACT

The present invention provides an array substrate for an IPS-LCD device. The array substrate has an image display area and an image non-display area. A first auxiliary line that receives a signal applied to a plurality of common electrodes is arranged in the image non-display area. A second auxiliary line that receives a signal applied to a gate line is also arranged in the image non-display area. The first and second auxiliary lines has the opposite polarity direct electrical currents, and thus, both negative and positive ions from sealant and overcoat layer are trapped in these first and second auxiliary lines. Accordingly, the deterioration of the liquid crystal layer is prevented, thereby increasing the reliability of a liquid crystal display device.

19 Claims, 4 Drawing Sheets

US 6,734,939 B2

ARRAY SUBSTRATE FOR LIQUID CRYSTAL DISPLAY DEVICE

This application claims the benefit of Korean Patent Application No. 2000-42534, filed on Jul. 24, 2000, which is hereby incorporated by reference as if fully set forth herein.

BACKGROUND OF THE INVENTION

1. Field of the Invention

The present invention relates to liquid crystal display devices. More particularly it relates to liquid crystal display devices implementing in-plane switching (IPS) where an electric field to be applied to liquid crystals is generated in a plane parallel to a substrate.

2. Discussion of the Related Art

A liquid crystal display device uses the optical anisotropy and polarization properties of liquid crystal molecules to produce an image. Liquid crystal molecules have a definite orientational alignment as a result of their long, thin shapes. That orientational alignment can be controlled by an applied electric field. In other words, as an applied electric field changes, so does the alignment of the liquid crystal molecules. Due to the optical anisotropy, the refraction of incident light depends on the orientational alignment of the liquid crystal molecules. Thus, by properly controlling an applied electric field a desired light image can be produced.

Of the different types of known LCDs, active matrix LCDs (AM-LCDs), which have thin film transistors and pixel electrodes arranged in a matrix form, are the subject of significant research and development because of their high resolution and superiority in displaying moving images.

LCD devices have wide application in office automation (OA) equipment and video units because they are light and thin, and have low power consumption characteristics. The typical liquid crystal display (LCD) panel has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors (TFTs), and pixel electrodes.

As previously described, LCD device operation is based on the principle that the alignment direction of the liquid crystal molecules is dependent upon an electric field applied between the common electrode and the pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon polarity of the applied voltage.

FIG. 1 is a schematic cross-sectional view illustrating a conventional LCD cell in an active matrix LCD. As shown, the LCD cell 20 has lower and upper substrates 2 and 4 and a liquid crystal (LC) layer 10 interposed therebetween. The lower substrate 2 has a thin film transistor (TFT) "S" as a switching element that switches a voltage that changes the orientation of the LC molecules. The lower substrate 2 also includes a pixel electrode 14 that is used to apply an electric field across the LC layer 10 in response to signals applied to the TFT "S". The upper substrate 4 has a color filter 8 for producing a color, and a common electrode 12 on the color filter 8. The common electrode 12 serves as an electrode that produces the electric field across the LC layer (with the assistance of the pixel electrode 14). The pixel electrode 14 is arranged over a pixel portion "P," i.e., a display area. Further, to prevent leakage of the LC layer 10, a pair of substrates 2 and 4 are sealed by a sealant 6.

As described above, since the common and pixel electrodes 12 and 14 of the conventional LCD panel are positioned on the upper and lower substrates 4 and 2, respectively, the electric field induced between them is perpendicular to the lower and upper substrates 2 and 4. The described liquid crystal display device has advantages of high transmittance and a high aperture ratio. Furthermore, because the common electrode 12 on the upper substrate 4 acts as a ground, the liquid crystal is shielded from static electricity.

However, the conventional LCD panels having the longitudinal electric field has a drawback in that they have a very narrow viewing angle. In order to solve the problem of narrow viewing angle, in-plane switching liquid crystal display (IPS-LCD) devices have been proposed. The IPS-LCD devices typically include a lower substrate where a pixel electrode and a common electrode are disposed, an upper substrate having no electrode, and a liquid crystal interposed between the upper and lower substrates.

A detailed explanation about operation modes of a typical IPS-LCD panel will be provided referring to FIGS. 2 and 3A to 3D.

As shown in FIG. 2, lower and upper substrates 30 and 32 are spaced apart from each other, and a liquid crystal 10 is interposed therebetween. The lower and upper substrates 30 and 32 are often referred to as array substrate and color filter substrate, respectively. On the lower substrate 30 are a pixel electrode 34 and a common electrode 36. The pixel and common electrodes 34 and 36 are aligned parallel to each other. On a surface of the upper substrate 32 is a color filter layer 42 that is commonly positioned between the pixel electrode 34 and the common electrode 36 of the lower substrate 30. An overcoat layer 44, which protects the color filter layer 42, is formed on the color filter layer 42. A voltage applied across the pixel and common electrodes 34 and 36 produces an electric field 35 through the liquid crystal "LC." The liquid crystal "LC" has a negative dielectric anisotropy, and thus it aligns parallel to the electric field 35. An edge sealant 40 is formed around the edges of the lower and upper substrates 30 and 32, and bonds the upper substrate 32 to the lower substrate 30 to prevent leakage of the liquid crystal "LC".

FIGS. 3A to 3D conceptually help illustrate the operation of a conventional IPS-LCD device. When no electric field is produced by the pixel and common electrodes 34 and 36, i.e., off state, as shown in FIGS. 3A and 3B, the longitudinal axes of the LC molecules "LC" are parallel and form a definite angle with the pixel and common electrodes 34 and 36. For example, FIG. 3B shows a common angle of 45 degrees between a line that is perpendicular to the pixel and common electrodes 34 and 36 and the longitudinal axes of the LC molecules.

On the contrary, when an electric field is produced by the pixel and common electrodes 34 and 36, i.e., on state, as shown in FIGS. 3C and 3D, because the pixel and common electrodes 34 and 36 are on the lower substrate 30, an in-plane electric field 35 that is parallel to the surface of the lower substrate 30 is produced. Accordingly, the LC molecules "LC" twist to bring their longitudinal axes into coincidence with the electric field. Thus, as shown in FIG. 3D, the LC molecules align with their longitudinal axes parallel with a line perpendicular to the pixel and common electrodes 34 and 36.

In the above-mentioned IPS-LCD panel, there is no common electrode on the color filter. Furthermore, since the above-mentioned IPS-LCD panel has the pixel electrode and the common electrode on the array substrate, it uses the parallel electric field to the array substrate.

Now, referring back to FIG. 2, the overcoat layer 44 is formed on the color filter layer 42 so as to cover and protect the color filter layer 42. Further, the edge sealant 40 is formed around the periphery of the IPS-LCD panel. However, there are some problems in the edge sealant 40 and the overcoat layer 44.

In general, a number of ions are contained in the edge sealant 40. As time passes, these ions migrate into the liquid crystal layer 10 after the LCD panel is complete. In other words, since the edge sealant 40 is formed of a epoxy-based resin that has a great water resistance, the edge sealant 40 includes sodium ions ($Na^+$), chlorine ions ($Cl^-$), potassium ions ($K^+$) and/or fluorine ions ($F^-$), and these ions flow out as time passes. As these ions migrate through the liquid crystal layer 10, they deteriorate the liquid crystal layer 10 and act as defects therein, thereby shortening life of the liquid crystal layer 10.

Furthermore, the color filter layer 42 contains a number of ions, but the overcoat layer 44 prevents these ions from coming out from the color filter 42. However, the overcoat layer 44 also contains a number of ions. The ions in the overcoat layer 44 also migrate into the liquid crystal layer 10 as time passes, thereby accelerating the deterioration of the liquid crystal layer 10. Since the overcoat layer 44 is commonly made of an acryl-based resin, this overcoat layer 44 contains sodium ions ($Na^+$), potassium ions ($K^+$), iron ions ($Fe^{2+}/Fe^{3+}$), aluminum ions ($Al^{3+}$), etc.

When the liquid crystal layer contains ions as described above, the driving voltage used to create the electric fields in the liquid crystal during operation of the liquid crystal is changed because of the presence of these ions. Accordingly, quality of the liquid crystal panel display degrades as the liquid crystal panel is used over time.

To overcome the display degradation caused by the migration of ions into the liquid crystal, an auxiliary line is used in a non-display area of the array substrate. FIG. 4 is a plan view of an array substrate illustrating a conventional in-plane switching mode liquid crystal display device that has such an auxiliary line. As shown in FIG. 4, the array substrate is divided into a pixel area and a non-pixel area. In the pixel area, a plurality of thin film transistors (TFTs), a plurality of pixel electrodes and a plurality of common electrodes 50 are arranged. On the other hand, a electrostatic discharge device 54 and an auxiliary line 52 are arranged in the non-pixel area. The auxiliary line 52 receives a signal that is applied to the common electrodes 50.

Still, referring to FIG. 4, since the signal applied to the auxiliary line 52 is a direct electrical current with a potential of several volts, an electric field is generated around the auxiliary line 52. Therefore, the ions permeated through the liquid crystal layer from the edge sealant and overcoat layer gather around the auxiliary line 52. However, in this case when the auxiliary line 52 receives the direct electrical current, the auxiliary line 52 catches only the ions that have a polarity opposite to the polarity of that direct electrical current. Namely, since the signal applied to the auxiliary line 52 commonly has a positive polarity, the auxiliary line 52 attracts the negative ions. Accordingly, positive ions still exist in the liquid crystal layer, thereby deteriorating the liquid crystal layer and decreasing the display quality of the liquid crystal panel.

SUMMARY OF THE INVENTION

Accordingly, the present invention is directed to an array substrate for an LCD device that substantially obviates one or more of the problems due to limitations and disadvantages of the related art.

An object of the present invention is to provide an LCD device having a stable image display.

Another object of the present invention is to provide an array substrate for an LCD device, which has a structure that prevents a liquid crystal layer from deteriorated.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

In order to achieve the above object, an embodiment in accordance with the principles of the present invention provides a liquid crystal display device that includes first and second substrates that are divided in a display area and a non-display area; a plurality of switching devices on the first substrate; first and second lines that apply signals to each switching device; a plurality of electrodes on the first substrate; a first auxiliary line arranged in the non-display area, the first auxiliary line receiving a first signal; a second auxiliary line arranged in the non-display area, the second auxiliary line receiving a second signal; and a liquid crystal layer between the first and second substrates.

The switching device includes a thin film transistor. The first line includes a gate line, while the second line includes a data line. The electrodes include a pixel electrode. A plurality of second electrodes includes a common electrode.

The plurality of the second electrodes receives the first signal, while the first line receives the second signal. The first auxiliary line is parallel with the first line, while the second auxiliary line is parallel with the first line.

The first auxiliary line includes a common line. Further, the second auxiliary line receives a signal having opposite polarity to a signal applied to the first line.

The liquid crystal display device further includes a plurality of pad portions in the non-display area and a plurality of electrostatic discharge device in the non-display area.

In another aspect, the principles of the present invention provide an array substrate for a liquid crystal display device, which includes a substrate having a display area and a non-display area; a plurality of switching devices arranged in the display area of the substrate; first and second lines that apply signals to each switching device; a plurality of electrodes on the substrate; a first auxiliary line arranged in the non-display area, the first auxiliary line receiving a first signal; and a second auxiliary line arranged in the non-display area, the second auxiliary line receiving a second signal.

The second auxiliary line receives a same signal as the first auxiliary line. Further, the first line is a gate line.

Furthermore, the second auxiliary line receives a periodically contrary signal from the first auxiliary line.

A plurality of the second electrodes receive the first signal, while the first line receives the second signal.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate an embodiment of the present invention and together with the description serve to explain the principles of that invention.

In the drawings.

DETAILED DESCRIPTION OF THE ILLUSTRATED EMBODIMENT

Reference will now be made in detail to an illustrated embodiment of the present invention, an example of which is shown in the accompanying drawings. Wherever possible, the same reference numbers will be used throughout the drawings to refer to the same or the parts.

In general, a liquid crystal display device includes a lower substrate (often referred to as an array substrate) in which a plurality of thin film transistors (TFTs), i.e., switching devices, are arranged; an upper substrate (often referred to as a color filter substrate) on which a plurality of color filters and an overcoat layer are formed; and a liquid crystal layer therebetween.

Figure 1:
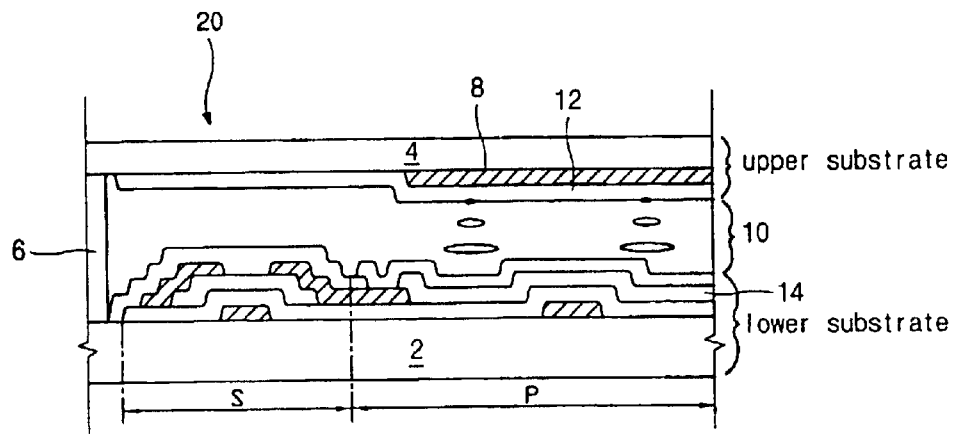
FIG. 1 is a cross-sectional view illustrating a liquid crystal display device according to the related art.
Figure 2:
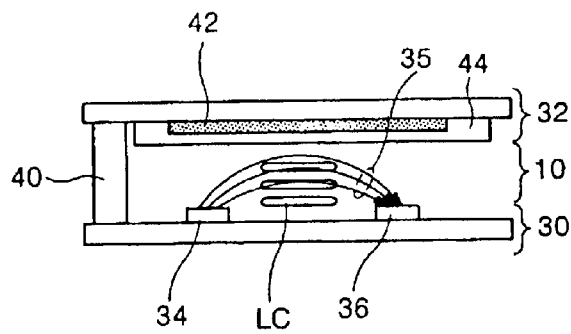
FIG. 2 is a cross-sectional view illustrating a conventional IPS-LCD device.
Figure 3A:
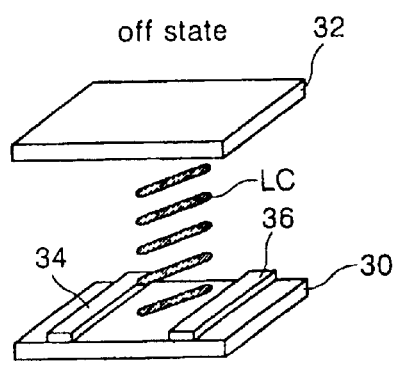
FIGS. 3A to 3D illustrate the operation of the device of FIG. 2.
Figure 3B:
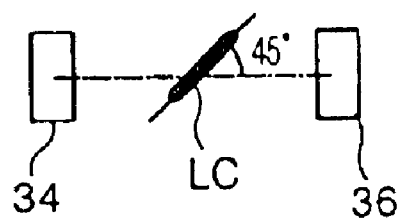
Figure 3C:
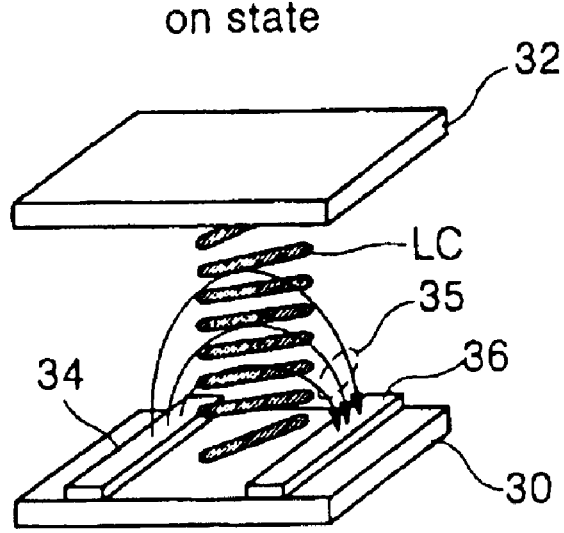
Figure 3D:
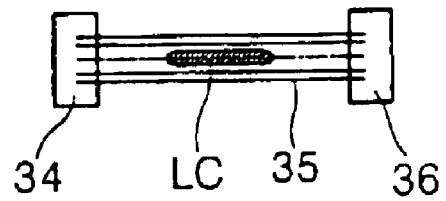
Figure 4:
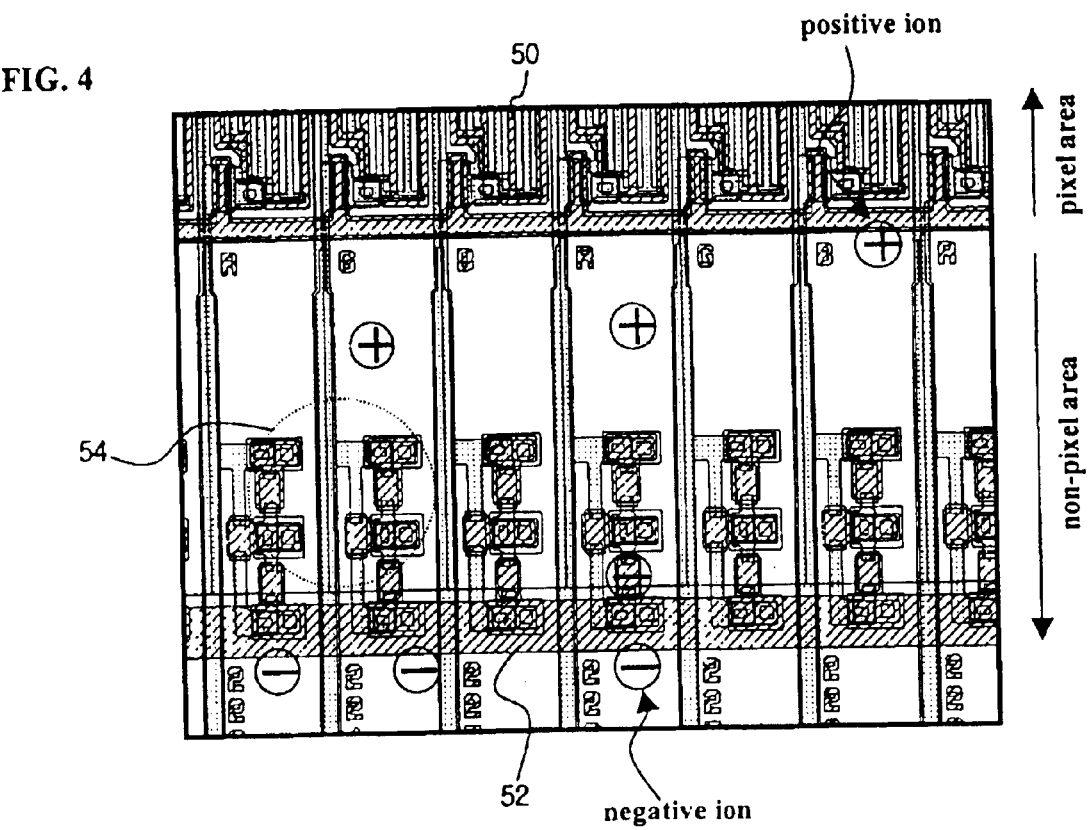
FIG. 4 is a plan view of an array substrate illustrating a conventional in-plane switching mode liquid crystal display device.
Figure 5:
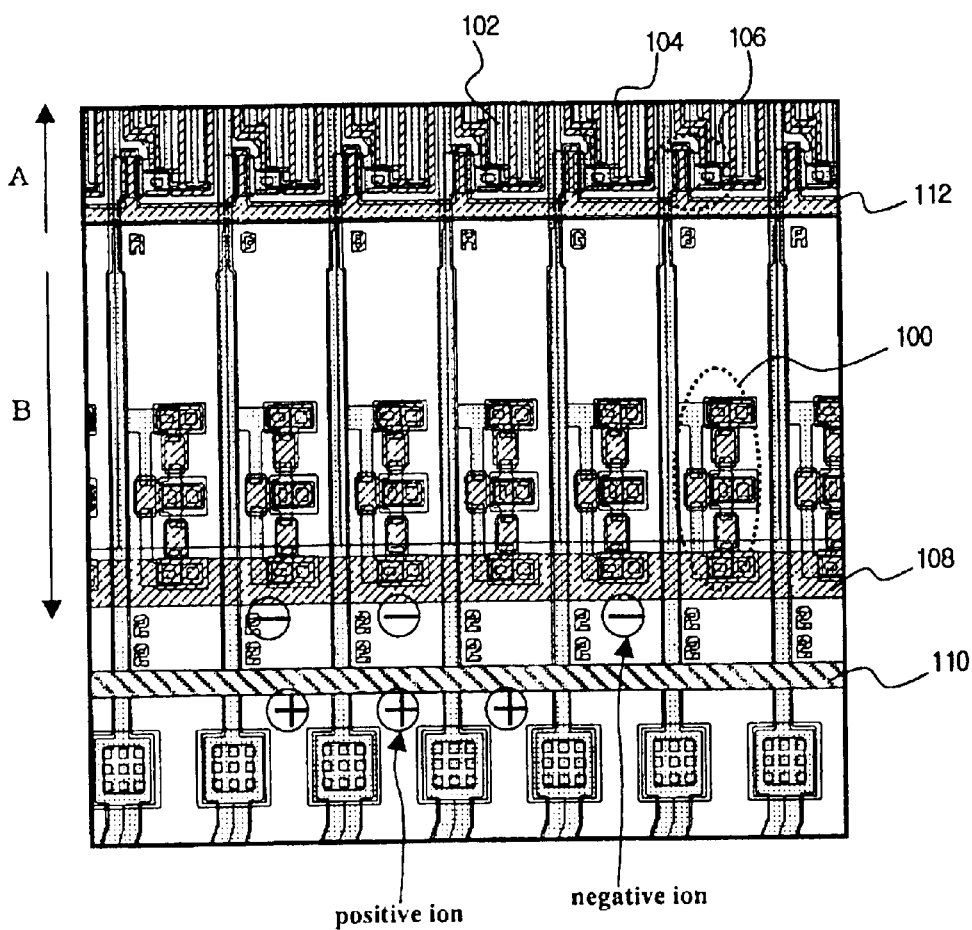
FIG. 5 is a plan view of an array substrate illustrating an in-plane switching mode liquid crystal display device according to the present invention.

FIG. 5 is a plan view of an array substrate illustrating an in-plane switching mode liquid crystal display device (IPS-LCD) according to the present invention. As shown, the array substrate of the IPS-LCD device is depicted, and this substrate is divided into image display area "A", i.e., a pixel area, and image non-display area "B", i.e., a non-pixel area. A plurality of pixel electrodes 102, a plurality of common electrodes 104, a plurality of gate lines 112 and a plurality of thin film transistors (TFTs) 106 are located in the image display area "A". A plurality of pad portions and a plurality of electrostatic discharge devices 100 are arranged in the image non-display area "B". Further, the sealant (not shown) that bonds the upper substrate to the lower substrate is also arranged in the image non-display area.

As described before, the sealant and the overcoat layer contain a number of ions. The problem caused by these ions, as explained before, is that the liquid crystal layer is deteriorated by these ions, thereby decreasing electrical characteristics and reliability of the liquid crystal layer. Namely, the liquid crystal molecules are orientated and aligned by switching operation of the thin film transistor. However, once the ions contained in the sealant and overcoat layer contaminate the liquid crystal layer, the driving voltage varies and is different from the desired one. Accordingly, the display quality is degraded.

Therefore, as shown in FIG. 5, a first auxiliary line 108 is formed in the image non-display area "B". Further, a second auxiliary line 110 is also arranged in the image non-display are "B", as compared with the conventional art. These first and second auxiliary lines 108 and 110 receive a direct electrical current with a potential of several volts, and gather the plurality of ions existing the liquid crystal layer.

The first auxiliary line 108 receives a first signal, which is the same as the signal is applied to the plurality of common electrodes 104. The second auxiliary line 110 receives a second signal, which is the same as the signal applied to the gate line 112. Here, the first signal applied to the first auxiliary line 108 has a positive polarity, and thus, the first auxiliary line 108 traps the negative ions.

Meanwhile, since the second auxiliary line 110 receives the second signal that is the same as the gate signal applied to the gate line 112, the second signal is negative (−) when the TFT 106, i.e., the switching device, is turned off, whereas the second signal is positive (+) when the TFT 106 is turned on. Due to the fact that the second auxiliary line 110 receives both positive voltage and negative voltage periodically, it is effective to gathering the plurality of ions.

The aforementioned reference is based on the IPS-LCD device. However, it is possible that the principle of the present invention is employed in the typical LCD device. Further, although the second auxiliary line 110 is arranged in the array substrate on the above-mentioned description, it can be arranged on the color filter substrate.

As described before, the liquid crystal display device of the present invention includes the first and second auxiliary lines 108 and 110. Further, the first auxiliary line 108 receives the first signal that is applied to the common electrodes 104 while the second auxiliary line 110 receives the second signal that is applied to the gate line 112. Accordingly, these first and second auxiliary lines 108 and 110 can effectively trap both the negative ions and the positive ions from the liquid crystal layer. In this structure of the present invention, since a number of both negative and positive ions are trapped in the auxiliary lines, the reliability of liquid crystal display device increases and the lifetime of liquid crystal layer is lengthened.

In other words, in the IPS-LCD device according to the present invention, the first and second auxiliary lines respectively receive direct electrical currents having contrary polarity. Therefore, both positive and negative ions that migrate from the sealant and overcoat layer into the liquid crystal layer are trapped at these auxiliary lines, thereby increasing the reliability and display quality of the liquid crystal display device.

It will be apparent to those skilled in the art that various modifications and variation can be made in the array substrate of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:

first and second substrates that are divided in a display area and a non-display area;

a plurality of switching devices on the first substrate;

first and second lines that apply signals to each switching device;

a plurality of first electrodes on the first substrate;

a first auxiliary line arranged in the non-display area, the first auxiliary line receiving a first signal;

a second auxiliary line arranged in the non-display area, the second auxiliary line receiving a second signal; and a liquid crystal layer between the first and second substrates, wherein the first line receives the second signal.

2. The device of claim 1, wherein the switching device includes a thin film transistor.

3. The device of claim 1, wherein the first line includes a gate line.

4. The device of claim 1, wherein the second line includes a data line.

5. The device of claim 1, wherein the first electrodes include a pixel electrode.

6. The device of claim 1, further comprising second electrodes on the first substrate wherein the second electrodes include a common electrode.

7. The device of claim 6, wherein the plurality of the second electrodes receives the first signal.

8. The device of claim 1, wherein the first auxiliary line is parallel with the first line.

9. The device of claim 1, wherein the second auxiliary line is parallel with the first line.

10. The device of claim 1, further comprising:

a plurality of pad portions in the non-display area; and a plurality of electrostatic discharge device in the non-display area.

11. The device of claim 1, wherein the first auxiliary line includes a common line.

12. A liquid crystal display device, comprising:

first and second substrates that are divided in a display area and a non-display area;

a plurality of switching devices on the first substrate;

first and second lines that apply signals to each switching device;

a plurality of first electrodes on the first substrate;

a first auxiliary line arranged in the non-display area, the first auxiliary line receiving a first signal;

a second auxiliary line arranged in the non-display area, the second auxiliary line receiving a second signal; and a liquid crystal layer between the first and second substrates;

wherein the second signal has a polarity opposite to a polarity of a signal applied to the first line.

13. An array substrate for a liquid crystal display device, comprising:

a substrate having a display area and a non-display area;

a plurality of switching devices arranged in the display area of the substrate;

first and second lines that apply signals to each switching device;

a plurality of first electrodes on the substrate;

a first auxiliary line arranged in the non-display area, the first auxiliary line receiving a first signal; and a second auxiliary line arranged in the non-display area, the second auxiliary line receiving a second signal, wherein the first line receives the second signal.

14. The array substrate of claim 13, wherein the first line is a gate line.

15. The array substrate of claim 13, wherein the second auxiliary line receives a signal having a polarity periodically opposite to a polarity of a signal received by the first auxiliary line.

16. The arrays substrate of claim 13, further comprising a plurality of second electrodes, wherein the plurality of the second electrodes receive the first signal.

17. An array substrate for a liquid crystal display device, comprising:

a substrate having a display area and a non-display area;

a plurality of switching devices arranged in the display area of the substrate;

first and second lines that apply signals to each switching device;

a plurality of first electrodes on the substrate;

a first auxiliary line arranged in the non-display area; and a second auxiliary line arranged in the non-display area;

wherein the second auxiliary line receives a same signal as the first auxiliary line.

18. A liquid crystal display device, comprising:

first and second substrates that are divided in a display area and a non-display area;

a plurality of switching devices on the first substrate;

gate lines and data lines that apply signals to each switching device, the gate lines substantially perpendicular to the data lines;

a plurality of first electrodes on the first substrate;

a first auxiliary line arranged in the non-display area, the first auxiliary line receiving a first signal and substantially parallel to the gate lines;

a second auxiliary line arranged in the non-display area, the second auxiliary line receiving a second signal and substantially parallel to the gate lines; and a liquid crystal layer between the first and second substrates.

19. An array substrate for a liquid crystal display device, comprising:

a substrate having a display area and a non-display area;

a plurality of switching devices arranged in the display area of the substrate;

gate lines and data lines that apply signals to each switching device, the gate lines substantially perpendicular to the data lines;

a plurality of first electrodes on the substrate;

a first auxiliary line arranged in the non-display area, the first auxiliary line receiving a first signal and substantially parallel to the gate lines; and a second auxiliary line arranged in the non-display area, the second auxiliary line receiving a second signal and substantially parallel to the gate lines.

* * * * *